United States Patent
Nitta

(10) Patent No.: US 9,336,477 B2
(45) Date of Patent: May 10, 2016

(54) RFID WRIST BAND

(71) Applicant: SATO HOLDINGS KABUSHIKI KAISHA, Tokyo (JP)

(72) Inventor: Haruhiko Nitta, Hyogo (JP)

(73) Assignee: SATO HOLDINGS KABUSHIKI KAISHA (JP)

( * ) Notice: Subject to any disclaimer, the term of this patent is extended or adjusted under 35 U.S.C. 154(b) by 0 days.

(21) Appl. No.: 14/414,731

(22) PCT Filed: Jun. 12, 2013

(86) PCT No.: PCT/JP2013/066157
§ 371 (c)(1),
(2) Date: Jan. 14, 2015

(87) PCT Pub. No.: WO2014/013818
PCT Pub. Date: Jan. 23, 2014

(65) Prior Publication Data
US 2015/0206044 A1 Jul. 23, 2015

(30) Foreign Application Priority Data
Jul. 17, 2012 (JP) ................................. 2012-158532

(51) Int. Cl.
*G06K 19/06* (2006.01)
*G06K 19/077* (2006.01)
*A44C 5/00* (2006.01)

(52) U.S. Cl.
CPC ......... *G06K 19/07762* (2013.01); *A44C 5/0015* (2013.01); *A44C 5/0053* (2013.01)

(58) Field of Classification Search
USPC .................. 235/492, 451; 340/572.1, 572.8
See application file for complete search history.

(56) References Cited

U.S. PATENT DOCUMENTS

| 5,564,096 A | * | 10/1996 | Hama et al. | .................... 455/300 |
| 2006/0230661 A1 | * | 10/2006 | Bekker | ........................... 40/633 |
| 2009/0273439 A1 | * | 11/2009 | Selsor | ........................... 340/5.61 |
| 2011/0068926 A1 | * | 3/2011 | Jong et al. | .................. 340/573.1 |
| 2011/0209373 A1 | * | 9/2011 | Padgett et al. | .................. 40/633 |

FOREIGN PATENT DOCUMENTS

| JP | 03-197195 | 8/1991 |
| JP | 2002-202723 | 7/2002 |
| JP | 2003-296675 | 10/2003 |
| JP | 2005-283992 | 10/2005 |
| JP | 2007-286213 | 11/2007 |

OTHER PUBLICATIONS

International Search Report dated Sep. 10, 2013 issued in corresponding International patent application No. PCT/JP2013/066157.

* cited by examiner

*Primary Examiner* — Ahshik Kim
(74) *Attorney, Agent, or Firm* — Ostrolenk Faber LLP

(57) ABSTRACT

The RFID wrist band includes an elastic block section including an airtight storage part, an elastic band section connected to the elastic block section to form an annular shape, and an inlay stored in the storage part and including a base substrate, an antenna on the base substrate, and an IC chip connected electrically with the antenna. The inlay is not fixed to an inner wall of the storage part, and the storage part is larger than a volume occupied by the inlay.

16 Claims, 13 Drawing Sheets

RFID WRIST BAND

CROSS REFERENCE TO RELATED APPLICATIONS

This present application is a 35 U.S.C. §371 National Phase conversion of PCT/JP2013/066157, filed on Jun. 12, 2013, which claims benefit of Japanese Application No. 2012-158532, filed Jul. 17, 2012, the disclosure of which is incorporated herein by reference. The PCT International Application was published in the Japanese language.

TECHNICAL FIELD

The present invention relates to a radio frequency identification (RFID) wrist band wound annularly around a wrist or an ankle of a human body for use, and particularly to an RFID wrist band including therein an inlay capable of reading and writing data in a non-contact manner.

BACKGROUND ART

Conventionally, in a hospital, for example, identification data unique to an individual such as a department, a name, an age, and a blood type of a patient is printed and displayed on a wrist band, and the wrist band is annularly wound loosely around a limb of the patient such as a wrist or an ankle to securely specify the patient.

Moreover, the wrist band includes therein an inlay to digitize the individual information and read and write the data in non-contact manner. As illustrated in FIGS. 3A and 3B, an inlay 1 includes, on one surface or both surfaces of a base substrate 11, an IC chip 12 storing data and an antenna 13 connected to the IC chip 12 to perform transmission and reception of information. The antenna 13 is electrically connected to an electrode 12a of the IC chip 12. Patent Literature 1 discloses a wrist band including a substrate composed of polyethylene or copolymer thereof and a non-contact RFID. However, the wrist band composed of stretchable silicone rubber is demanded from the viewpoint of durability for long-time use, for example.

Patent Literature 2 discloses a silicone rubber wrist band having a recessed part. In the case of this wrist band, an inlay is sealed in the recessed part by an adhesive. Patent Literature 3 discloses an RFID wrist band composed of silicone rubber and including an inlay laminated with a hard film.

However, the adhesive and the hard film have low flexibility and stretchability, and thus have poor following property relative to deformation and elongation of silicone rubber. When an inlay and a hard film laminating the inlay are in totally closed contact, as in Cited Literature 3, there is a problem that a joint portion between the IC chip and the antenna cannot bear the stress due to bending action, which causes disconnection. That is, regarding the inlay 1, when the stress due to bending action is added on the inlay 1, the IC chip 12 may be broken and damaged, or the electrode 12a bonding the IC chip 12 and the antenna 13 may be detached or separated (see FIGS. 13A and 13B). Moreover, when the inlay is laminated with a hard film or sealed with an adhesive, the production man-hours are increased, thereby causing a problem of requiring additional materials, for example.

CITATION LIST PATENT LITERATURE

Patent Literature 1: Japanese Patent Application Laid-open No. 2005-283992

Patent Literature 2: Japanese Patent Application Laid-open No. 2003-296675

Patent Literature 3: Japanese Patent Application Laid-open No. 2007-286213

SUMMARY OF INVENTION TECHNICAL PROBLEM

In view of various problems described above, the invention aims at providing an RFID wrist band without damage of an IC chip due to a crack, for example, or detachment and separation of an electrode bonding the IC chip and an antenna even when receiving external impact, puling, or bending. Moreover, the invention aims at providing an RFID wrist band having a margin in a storage part storing an inlay to secure the degree of freedom allowing the inlay to move. Furthermore, the invention aims at providing an RFID wrist band curving along a wrist or an ankle when attached on the wrist or the ankle but preventing a load imposed on the inlay itself stored in the storage part. Furthermore, the invention aims at providing an RFID wrist band capable of reducing the man-hours in the production processes and reducing materials.

SOLUTION TO PROBLEM

The invention is an RFID wrist band comprising an elastic block section including a storage part which is airtight, an elastic band section connected to the elastic block section to form an annular shape, and an inlay stored in the storage part and including a base substrate, an antenna on the base substrate, and an IC chip connected electrically to the antenna, wherein the inlay is not fixed to an inner wall of the storage part, and the storage part is larger than a volume occupied by the inlay. It is preferable that at least one part of the inner wall of the storage part in contact with the inlay is constituted by an uneven surface.

The second inventions is an RFID wrist band comprising an elastic block section including a storage part which is airtight, an elastic band section connected to the elastic block section to form an annular shape, and an inlay stored in the storage part and including a base substrate, an antenna on the base substrate, and an IC chip connected electrically with the antenna, wherein one part of the inlay is fixed to an inner wall of the storage part, and the storage part is larger than a volume occupied by the inlay. It is preferable that the inlay is fixed to the inner wall of the storage part by a point securing portion formed in a part of the inlay. It is preferable that one part of the inlay is fixed by a projection portion formed on the inner wall of the storage part. It is preferable that the inlay is engaged by at least one mounting groove formed on the inner wall of the storage part. It is preferable that the inlay includes a throughhole and a support formed on the inner wall of the storage part penetrates through the through-hole. It is preferable that the inlay may not be laminated with a film. It is preferable that the elastic block section and the elastic band section may have different colors. It is preferable that the elastic block section and the elastic band section may have different hardness. It is preferable that the elastic block section and the elastic band section are composed of silicone resin.

ADVANTAGEOUS EFFECTS OF INVENTION

According to the RFID wrist band of the invention, even when the inlay receives stress by external impact, pulling, and bending, it is possible to prevent damage of an IC chip due to a crack, for example, or detachment and separation of an electrode bonding the IC chip and an antenna, resulting in the improvement of the durability and the stable communication performance.

DESCRIPTION OF EMBODIMENTS

In the following, an RFID wrist band of the invention will be described with reference to the drawings. The invention will be described using the following preferred embodiments. However, modifications can be made by a number of methods without departing from the scope of the invention, and embodiments other than the embodiments described herein can be used. Therefore, all modifications in the scope of the invention are included in the scope of claims.

Figure 1:
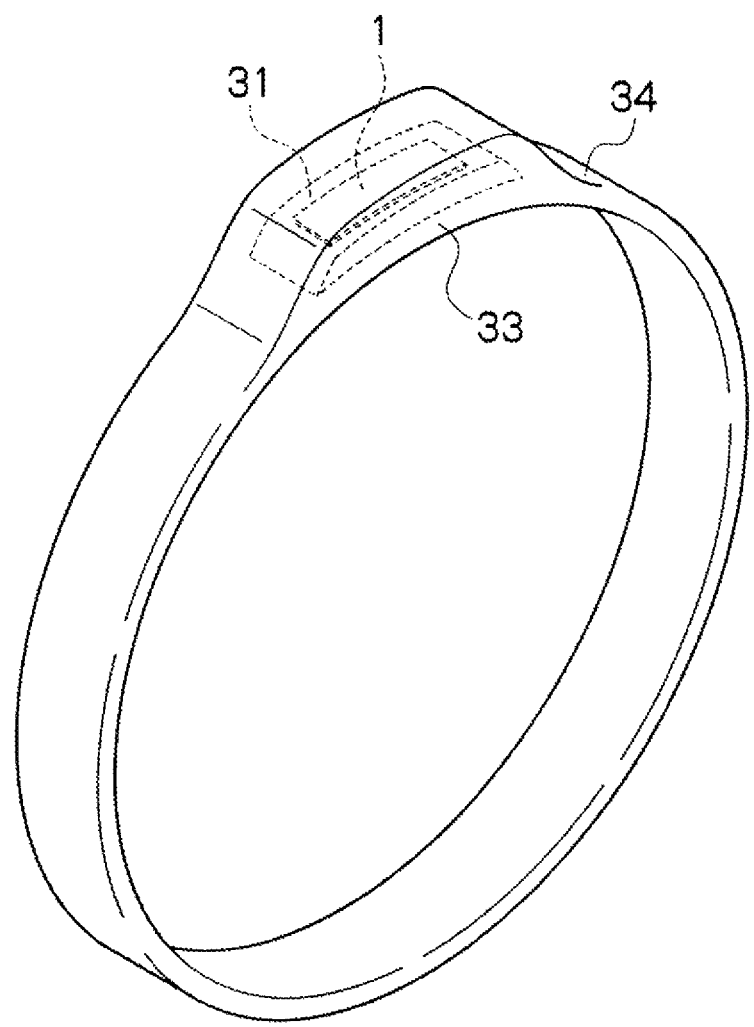
FIG. 1 is a perspective view of an RFID wrist band.
Figure 2:
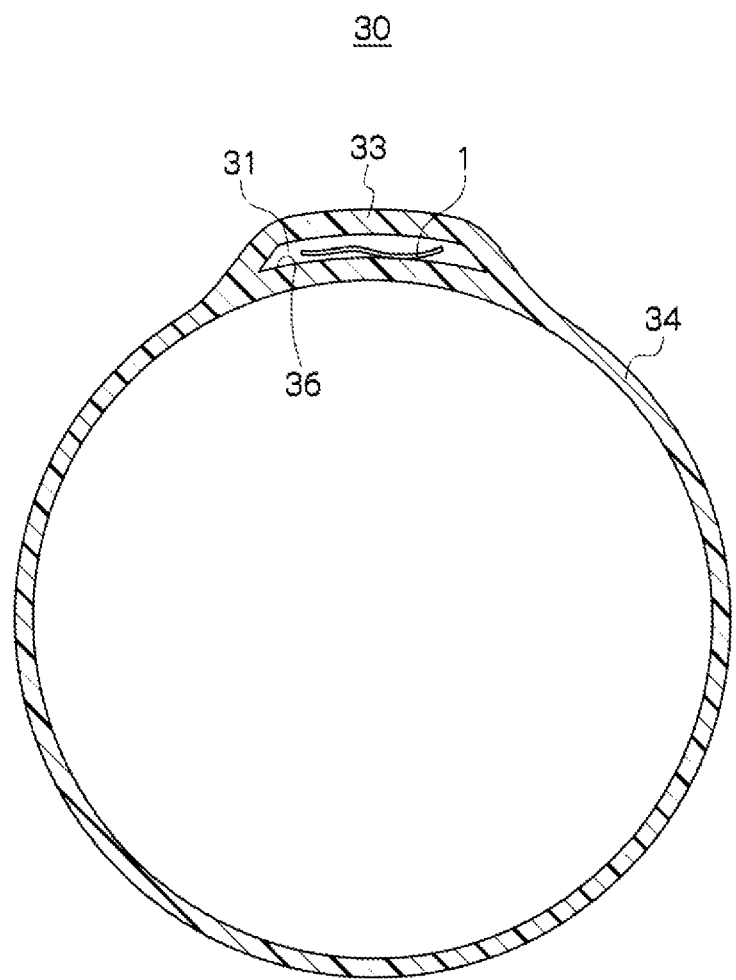
FIG. 2 is a cross sectional view of an RFID wrist band along a circumferential direction.

FIG. 1 is a perspective view of an RFID wrist band. FIG. 2 is a cross sectional view of an RFID wrist band along a circumferential direction. An RFID wrist band 30 includes an elastic block section 33 and an elastic band section 34 connected to both ends of the elastic block section 33 to form an annular shape. In the elastic block section 33, a storage part 31 storing therein the inlay 1 is formed.

The storage part 31 is airtight space formed by being surrounded by a plurality of inner walls 36 constituted by a part of the elastic block section 33 or the elastic band section 34. The storage part 31 is formed to be lager than a volume (a bulk) occupied by the inlay 1. The detail of the storage part 31 will be described in the first embodiment to the sixth embodiment described later.

The elastic block section 33 and the elastic band section 34 are composed of an elastic member, and thus are extended easily and can comfortably fit a wrist or an ankle, for example. As the material composing the elastic member, thermosetting urethane rubber and thermosetting silicone rubber can be used, for example. In addition, there can be used thermoplastic elastomer such as styrene-based thermoplastic elastomer, olefin-based thermoplastic elastomer, urethane-based thermoplastic elastomer, polyester-based thermoplastic elastomer, polyamide-based thermoplastic elastomer, and fluorine-based thermoplastic elastomer. Among them, the thermosetting silicone rubber having excellent weather resistance, heat resistance, chemical resistance, and flexibility, for example, and having a low relative dielectric constant is particularly preferable.

Moreover, the hardness of the elastic block section 33 and the elastic band section 34 can be selected appropriately. For example, the hardness of the elastic block section 33 and the elastic band section 34 can be same or different. By increasing the rubber hardness of the elastic block section 33 and reducing the rubber hardness of the elastic band section 34, the stretching rate of the elastic block section 33 can be suppressed even if the elastic band section 34 is stretched when attached on a wrist.

Furthermore, the elastic block section 33 and the elastic band section 34 can optionally contain a coloring agent such as a known inorganic pigment, organic pigment, and dye. For example, by including a black pigment such as carbon black, and the material constituting the elastic band section 34 includes a white pigment such as titanium oxide in the material constituting the elastic block section 33, the elastic block section 33 and the elastic band section 34 can be distinguished. In this manner, the elastic block section 33 mounting the inlay 1 can be visually recognized easily in the RFID wrist band 30, which makes it possible to securely bring the elastic block section 33 mounting the inlay 1 close to a reader writer (not illustrated) and read data easily.

When the RFID wrist band 30 is used for a medical purpose, it is possible to provide the antibacterial property to the elastic block section 33 and the elastic band section 34 by containing an antibacterial agent therein. As the antibacterial agent, there can be used a silver-based antibacterial agent such as silica gel silver, silver zeolite, and silver-incorporated calcium phosphate, a zinc oxide-based antibacterial agent, a benzimidazole-based antibacterial agent, a triazine-based antibacterial agent, a pyrithione-based antibacterial agent, a nitrile-based antibacterial agent, and an organic iodine-based antibacterial agent, for example.

Figure 3A:
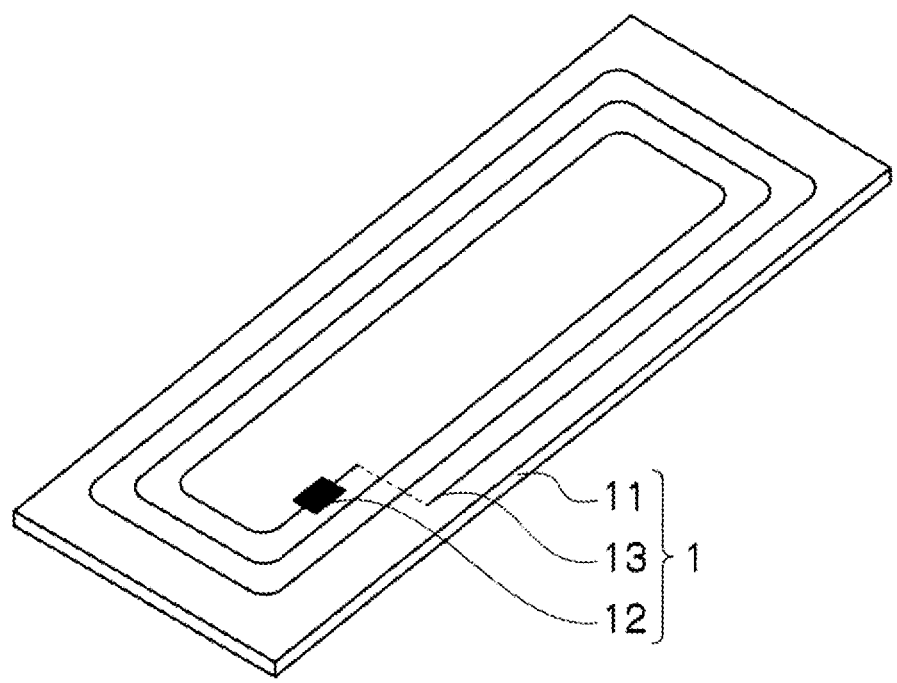
FIG. 3A is a schematic configuration diagram of an inlay.
Figure 3B:
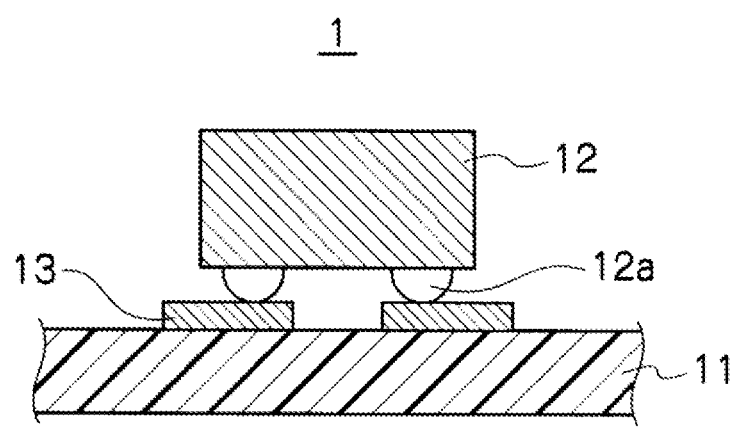
FIG. 3B is an enlarged cross sectional view of a main part of an IC chip mounting portion of the inlay.
Figure 13A:
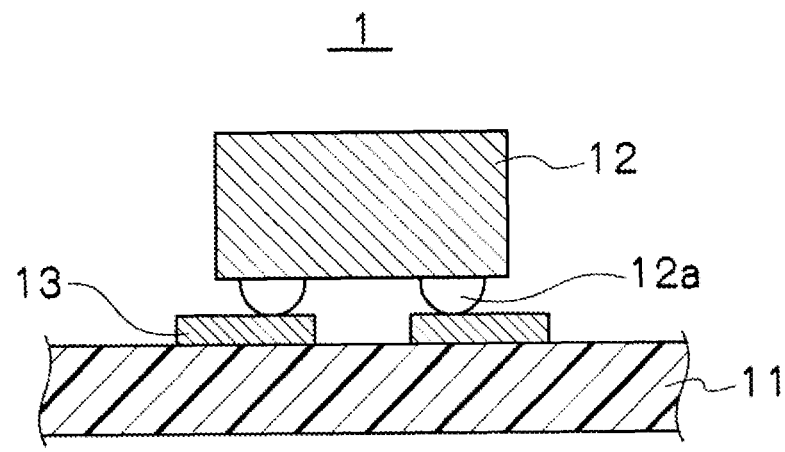
FIG. 13A is an enlarged view of an IC chip mounting portion of an inlay.
Figure 13B:
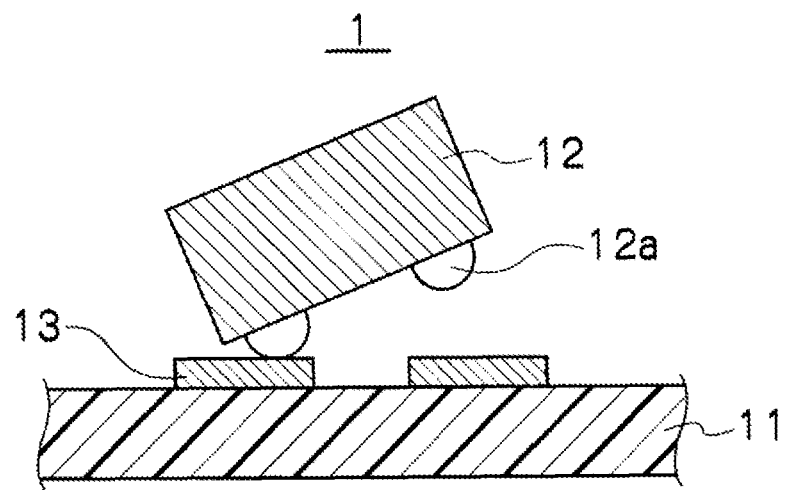
FIG. 13B is an enlarged view illustrating a damaged state of an IC chip mounting portion of an inlay.

Next, the configuration of the inlay 1 stored in the storage part 31 will be described. FIG. 3A is a schematic configuration diagram of an inlay included in an RFID wrist band. FIG. 3B is an enlarged cross sectional view of a main part of an IC chip mounting portion of the inlay. It is noted that FIGS. 3A and 3B have the same configuration as FIGS. 13A and 13B and are thus represented with same symbols. The inlay 1 is a non-contact IC circuit capable of performing non-contact communication with a reader writer, and includes, on one surface or both surfaces of the base substrate 11, the IC chip 12 storing data and the antenna 13 connected to the IC chip 12 to perform transmission and reception of information. The antenna 13 is electrically connected to the electrode 12a of the IC chip 12. It is noted that the inlay 1 is often wavy or curved because the base substrate 11 itself is a thin material.

The inlay 1 wirelessly performs reading and writing of data (data communication) necessary for the IC chip 12 through the antenna 13 using radio waves in a UHF band (300 MHz to 3 GHz (preferably 860 to 960 MHz, more specifically 433 MHz, 900 MHz, 915 to 928 MHz, 950 to 958 MHz)), microwaves (1 to 30 GHz, specifically 2.45 GHz), an HF band (3 MHz to 30 MHz (preferably 13.56 MHz)), or radio waves in other given frequency bands such as ones in 135 kHz or less, and electromagnetic action, for example. In the inlay 1, the specific configuration of the chip 12 and the antenna 13 is set to be appropriate depending on each radio wave used.

As the material of the base substrate 11 used in the inlay 1, there can be used polyesters such as polyethylene terephthalate, polyethylene naphthalate, polybutylene terephthalate, and polyethylene terephthalate/isophthalate copolymer, polyolefin resin such as polyethylene and polypropylene, polyethylene fluoride resin such as polyvinyl fluoride, polyvinylidene fluoride, polytetrafluoroethylene, and ethylene-4 tetrafluoroethylene copolymer, polyamide such as nylon 6 and nylon 66, vinyl-based resin such as polyvinyl chloride, vinyl chloride/vinyl acetate copolymer, ethylene/vinyl acetate copolymer, ethylene/vinyl alcohol copolymer, cellulose-based resin such as cellulose triacetate and cellophane, acrylic resin such as polymethyl methacrylate, polyethyl methacrylate, polyethyl acrylate, and polybutyl acrylate, a simple substance such as polystyrene, polycarbonate, and polyimide, and the mixture thereof, which can be used as long as they are insulating organic material.

The antenna 13 is composed of conductive foil such as copper foil and aluminium foil. The conductive foil such as copper foil and aluminium foil is formed on the base substrate 11, and the conductive foil is etched, whereby the antenna 13 composed of conductive foil can be obtained. As another method, a conductive ink is printed on the base substrate 11, whereby the antenna 13 composed of a conductive ink can be obtained. One surface or both surfaces of the inlay 1 may be laminated with a film. When the inlay 1 is not laminated with a film, it is possible to reduce the man-hours in the production processes and reduce materials.

Figure 4:
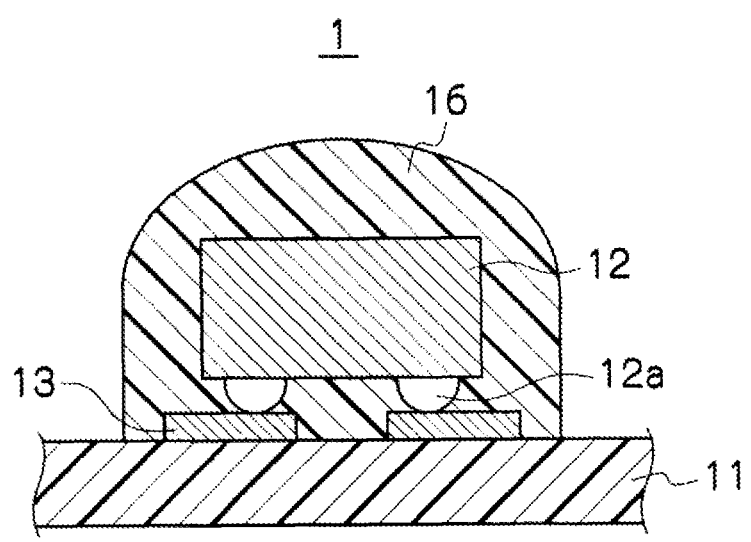
FIG. 4 is an enlarged cross sectional view of a main part of an IC chip mounting portion of an inlay of another form.

FIG. 4 is a main part enlarged section of an IC chip mounting portion of the inlay 1 of another aspect. A covering part 16 is formed on a portion of an IC chip 6 of the inlay 1 by potting processing. The covering part 16 is obtained by covering with ultraviolet curing-type resin or covering with thermal reactive curing-type or two-liquid mixing reactive curing-type liquid resin such as epoxy resin, and then curing it. In addition, there can be used thermoplastic resin or thermosetting resin containing glass fiber, carbon fiber, aramid fiber, and ceramic fiber (silicon carbide, boron, alumina), whisker ($Al_2O_3$, β-SiC, graphite, potassium titanate, polyoxymethylene), for example. Among them, the epoxy resin containing glass fiber is particularly preferable. The covering part 16 can protect the IC chip 12 and the electrode 12a bonding the IC chip 12 and the antenna 13, whereby the impact resistance can be further improved.

Next, the forms in which the inlay 1 is arranged in the storage part 31 will be described with reference to FIGS. 5 to 12B.

(First Embodiment)

Figure 5:
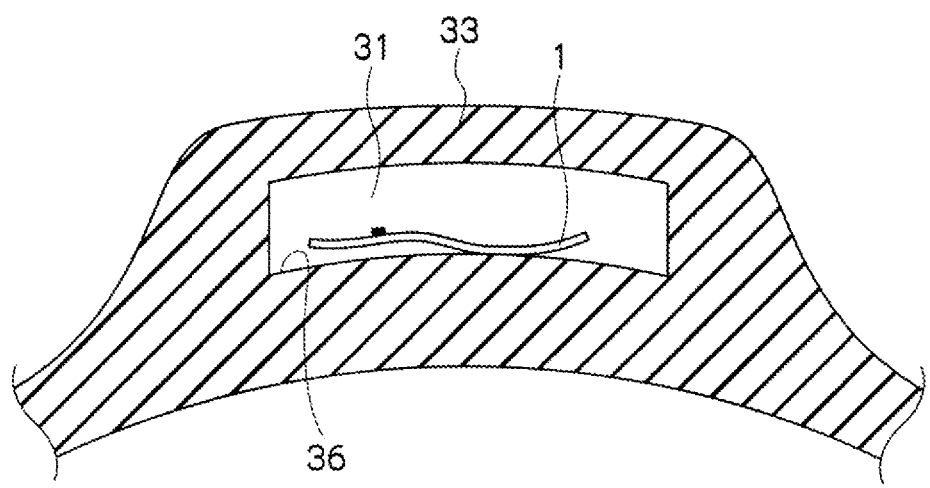
FIG. 5 is an enlarged cross sectional view of a main part of an RFID wrist band according to a first embodiment.

FIG. 5 is an enlarged cross sectional view of a main part of an RFID wrist band representing a first embodiment. The inlay 1 is stored in the storage part 31 larger than a volume occupied by the inlay 1, and arranged in a state not fixed to any of the inner walls 36. Even when the elastic block section 33 receives external impact and the inside storage part 31 is deformed or twisted largely, the inlay 1 can move freely in the storage part 31 and no stress is added directly thereon. Thus, it is possible to prevent damage of the IC chip 12 due to a crack, for example, or detachment and separation of the electrode 12a bonding the IC chip 12 and the antenna 13. Moreover, the storage part 31 maintains airtightness, and thus prevents the case in which inundation, etc. disables the inlay 1 to perform communication. Therefore, it is possible to form the RFID wrist band 30 having high durability.

Figure 6A:
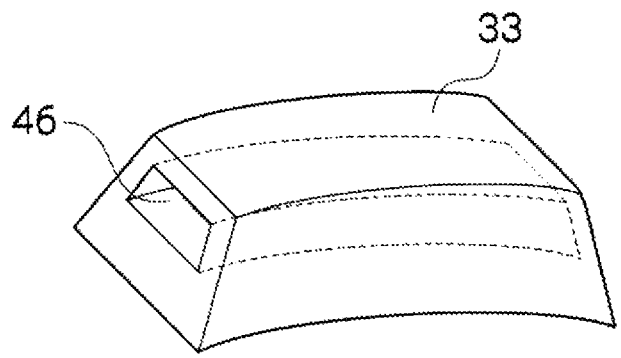
FIGS. 6A-6C are diagrams illustrating production procedures of an RFID wrist band.
Figure 6B:
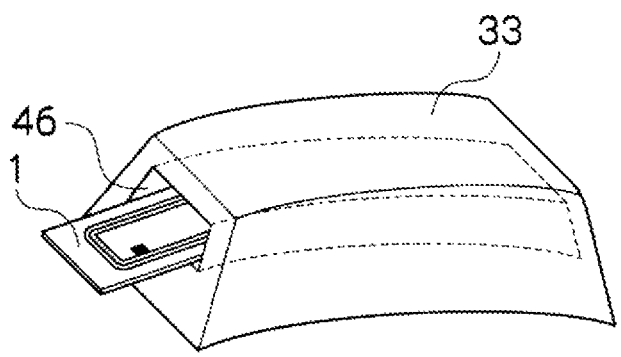
Figure 6C:
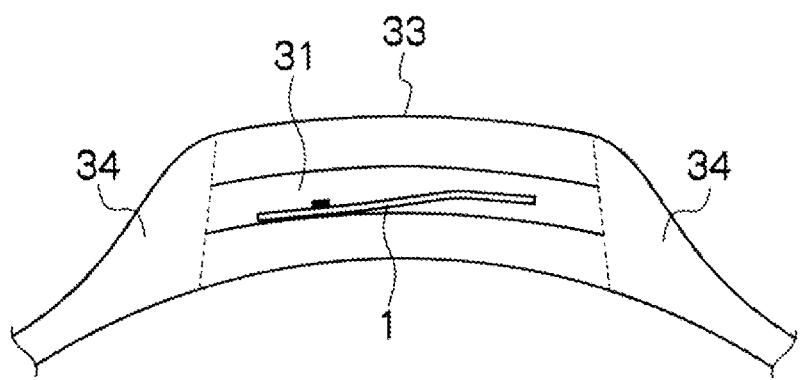

The RFID wrist band 30 is formed in the following manner. As illustrated in FIG. 6A, an elastic member such as thermosetting silicone rubber is arranged in a recessed part of a lower mold (not illustrated), and an upper mold (not illustrated) is pressed against the lower mold. Then, heating and pressurizing are performed to form the elastic block section 33 having an insertion hole 46 (primary molding, semivulcanized state). As illustrated in FIG. 6B, the inlay 1 is inserted into the insertion hole 46 of the elastic block section 33. As illustrated in FIG. 6C, an elastic member for the elastic band section 34 is arranged at the both ends of the elastic block section 33 formed by the primary molding, and then heating and pressurizing are performed, whereby the elastic block section 33 and the elastic band section 34 are welded and formed annularly (secondary molding, vulcanized state). In this case, the elastic band section 34 is welded so as to close completely the through-hole 46 of the elastic block section 33. Thus, the closely sealed storage part 31 is formed in the elastic block section 33.

(Second Embodiment)

Figure 7:
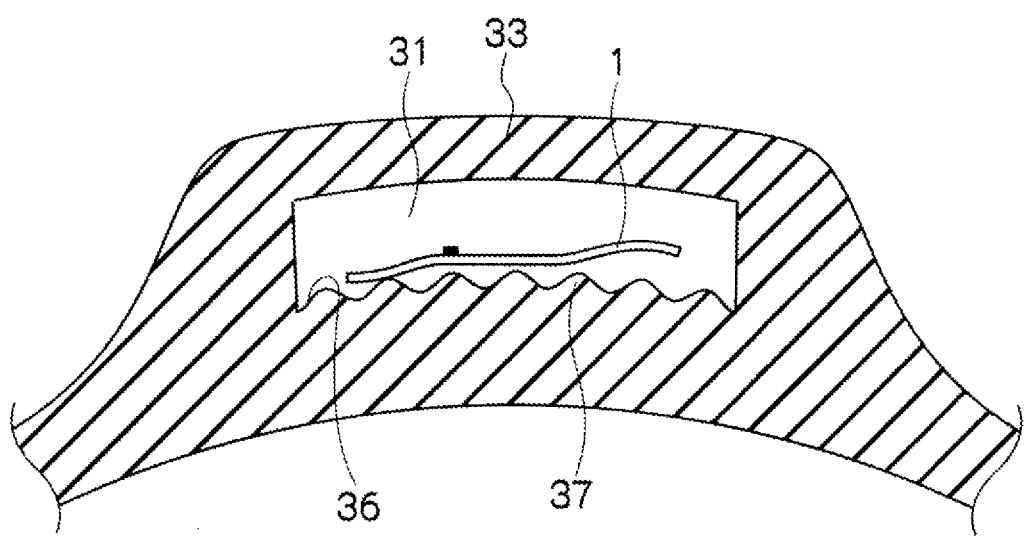
FIG. 7 is an enlarged cross sectional view of a main part of an RFID wrist band according to a second embodiment.

FIG. 7 is an enlarged cross sectional view of a main part of an RFID wrist band representing a second embodiment. The inlay 1 is arranged in a state not fixed to any of the inner walls 36 of the storage part 31.

In the second embodiment, at least one part of the inner walls 36 of the storage part 31 in contact with the inlay 1 is constituted by an uneven surface 37. When one part of the inner walls 36 of the storage part 31 is constituted by the uneven surface 37, the contact area between the inlay 1 and the inner wall 36 becomes small, so that they are not in close contact with each other. In this manner, it is possible to reduce frictional resistance occurred between the inlay 1 and the inner wall 36 and suppress stress between layers occurred in bending action. Therefore, even when the elastic block section 33 is curved, the degree of freedom of the inlay 1 is secured in the storage part 31, which prevents a load imposed on the inlay 1 arranged in the storage part 31. Then, it is possible to prevent detachment and separation of the electrode 12a bonding the IC chip 12 and the antenna 13. It is noted that the difference between the top and the bottom of the uneven surface 37 is preferably between 0.1 mm and 2.0 mm. When the difference is less than 0.1 mm, the uneven surface 37 does not function and when it is more than 2.0 mm, the electrode 12a bonding the IC chip 12 and the antenna 13 may be detached and separated by convex portions of the uneven surface 37.

(Third Embodiment)

Figure 8:
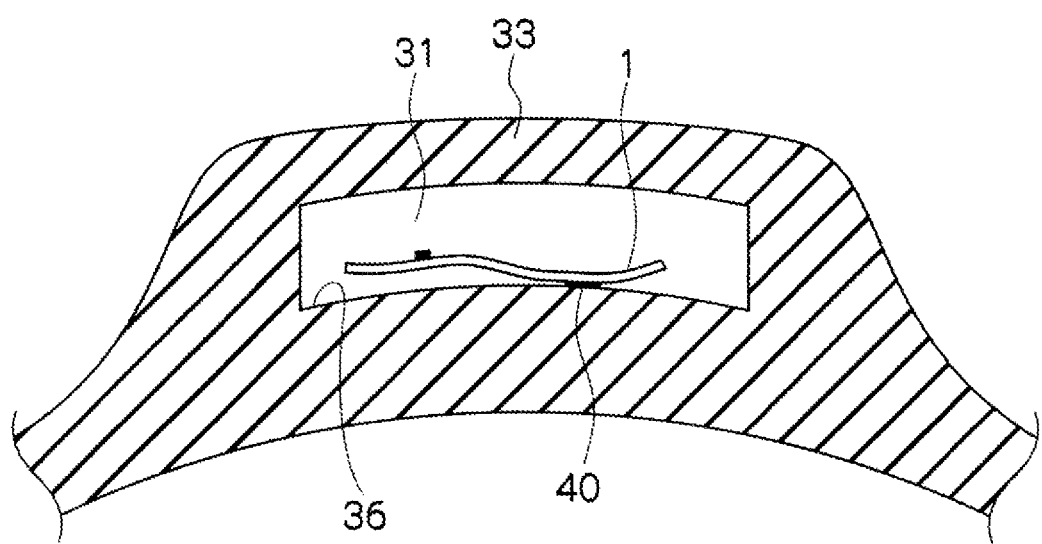
FIG. 8 is an enlarged cross sectional view of a main part of an RFID wrist band according to a third embodiment.

FIG. 8 is an enlarged cross sectional view of a main part of an RFID wrist band representing a third embodiment. In the third embodiment, a point securing portion 40 is formed in one part of the inlay 1. The point securing portion 40 is a minute portion of the inlay 1. The point securing portion 40 is formed by known thermal fusing means such as thermofusion pressure bonding, heat sealing, high frequency welder fusing, and ultrasonic welder fusing.

In this manner, when one part of the inlay 1 is fixed on the inner wall 36 of the storage part 31 by the point securing portion 40, the inlay 1 does not move excessively in the storage part 31. Even when receiving external bending and impact, the degree of freedom allowing the inlay 1 to move is secured in the storage part 31. Thus, no stress is added directly, and damage of the IC chip 12 can be prevented. Moreover, even when the elastic block section 33 is stretched or curved, and the storage part 31 is deformed or twisted largely, the inner wall 36 and the inlay 1 in the storage part 31 are deformed in different manners, which can prevent detachment and separation of the electrode 12a bonding the IC chip 12 and the antenna 13.

(Fourth Embodiment)

Figure 9:
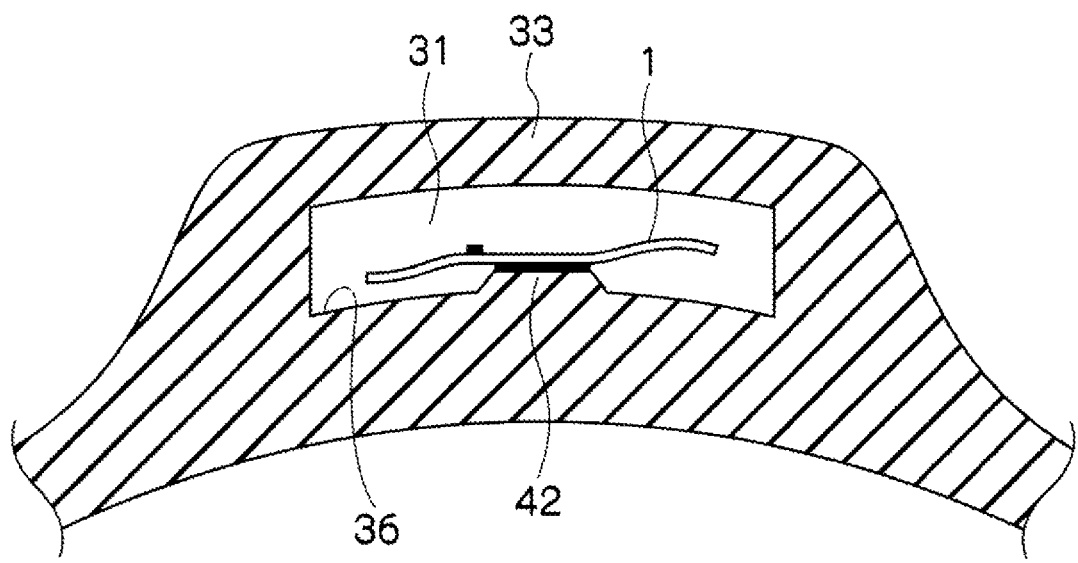
FIG. 9 is an enlarged cross sectional view of a main part of an RFID wrist band according to a fourth embodiment.

FIG. 9 is an enlarged cross sectional view of a main part of an RFID wrist band representing a fourth embodiment. In the fourth embodiment, the inlay 1 is arranged in the storage part 31 in a state where one part of the inlay 1 is fixed to a projection portion 42 formed on the inner wall 36 of the storage part 31. The storage part 31 is larger than a volume occupied by the inlay 1. The inlay 1 is not contact with the inner wall 36 except for the projection portion 42. As the method for welding the part of the inlay 1 to the projection portion 42, easy processing is possible by known thermal fusing means such as thermofusion pressure bonding, heat sealing, high frequency welder fusing, and ultrasonic welder fusing. As another adhesion method, there can be used simple bonding by heat-resistant both-sided tape or hot melt welding, for example. Particularly, the method using heat-resistant both-sided tape is preferable.

The inlay 1 is partially fixed to the projection portion 42. Thus, it is possible to secure the degree of freedom allowing the inlay 1 to move in the storage part 31. Even when the storage part 31 of the elastic block section 33 is deformed by external impact, the inlay 1 stored in the storage part 31 is not influenced directly, which prevents detachment and separation of the electrode 12a bonding the IC chip 12 and the antenna 13.

(Fifth Embodiment)

Figure 10:
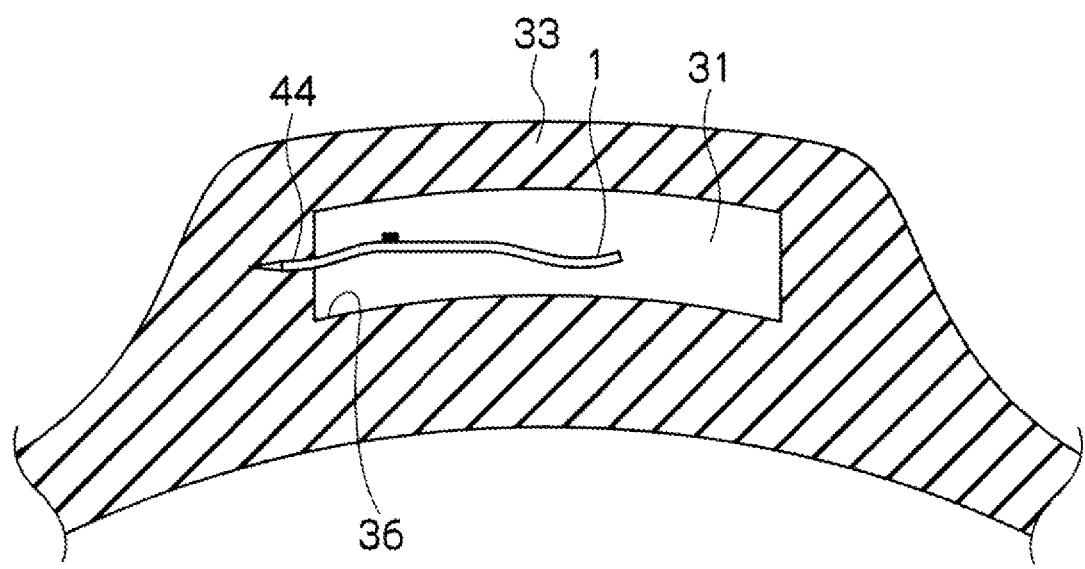
FIG. 10 is an enlarged cross sectional view of a main part of an RFID wrist band according to a fifth embodiment.
Figure 11:
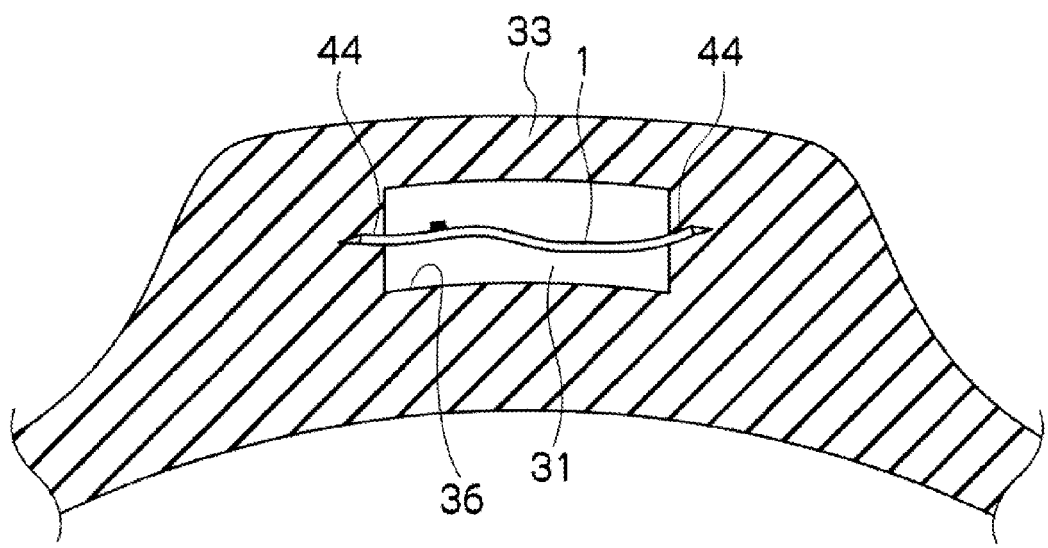
FIG. 11 is an enlarged cross sectional view of a main part of an RFID wrist band according to another form of the fifth embodiment.

FIG. 10 is an enlarged cross sectional view of a main part of an RFID wrist band representing a fifth embodiment. The inlay 1 is arranged in the storage part 31 in a state where one end of the inlay 1 is engaged in a mounting groove 44 formed on the inner wall 36 of the storage part 31. FIG. 11 is an enlarged cross sectional view of a main part of an RFID wrist band of another aspect of the fifth embodiment. The inlay 1 is arranged in the storage part 31 in a state where the both ends of the inlay 1 are engaged in the mounting grooves 44 formed respectively on the facing inner walls 36 of the storage part 31. Although the both ends of the inlay 1 are engaged in the mounting grooves 44, the storage part 31 is larger than a volume occupied by the inlay 1, and thus it is possible to secure the degree of freedom allowing the inlay 1 to move in the storage part 31. Even when the storage part 31 of the elastic block section 33 is deformed by external impact, the inlay 1 stored in the storage part 31 is not influenced directly, which prevents detachment and separation of the electrode 12a bonding the IC chip 12 and the antenna 13.

(Sixth Embodiment)

Figure 12A:
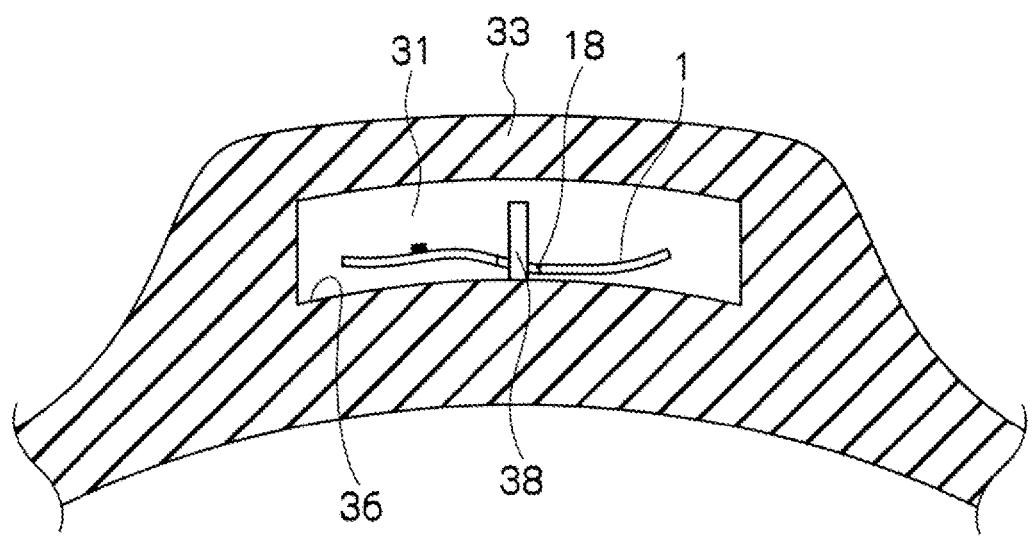
FIG. 12A is an enlarged cross sectional view of a main part of a sixth embodiment.
Figure 12B:
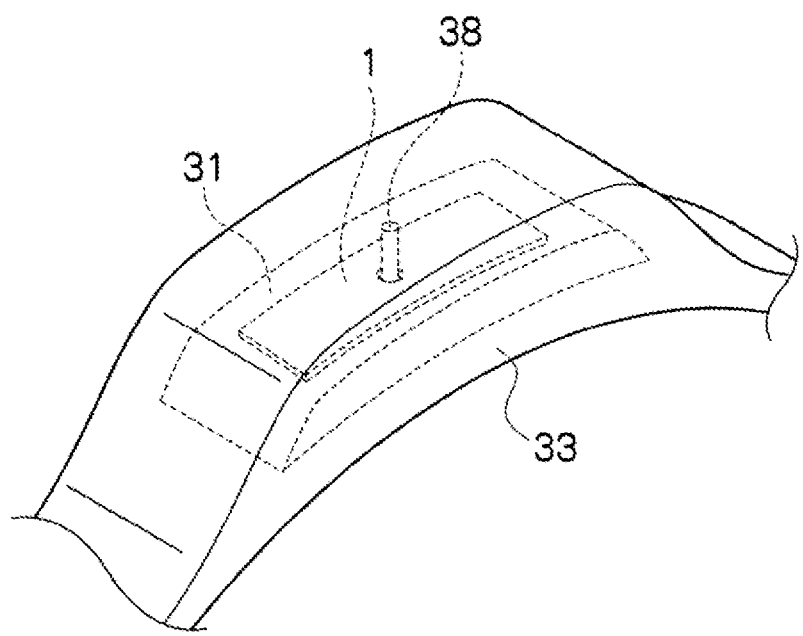
FIG. 12B is a partial perspective view of the sixth embodiment.

FIG. 12A is an enlarged cross sectional view of a main part of an RFID wrist band representing a sixth embodiment. FIG. 12B is a partial perspective view of an RFID wrist band representing the sixth embodiment. The inlay 1 is arranged in a state where the inlay 1 is fixed to a support 38 on the inner wall 36 of the storage part 31. In the sixth embodiment, the support 38 is formed on the inner wall 36. A through-hole 18 is formed on the base substrate 11 of the inlay 1. The support 38 formed on the inner wall 36 of the storage part 31 is inserted into the through-hole 18 of the inlay 1. When the support 38 is inserted in the through-hole 18 of the inlay 1, the inlay 1 is fixed to the inner wall 36 of the storage part 31. The through-hole 18 of the inlay 1 penetrated by the support 38 is slightly larger than a diameter of the support 38. Thus, the inlay 1 can freely move vertically and horizontally in the range, which can secure the degree of freedom allowing the inlay 1 to move in the storage part 31. As a result, it is possible to prevent detachment and separation of the electrode 12a bonding the IC chip 12 and the antenna 13. It is noted that although the support 38 has a columnar shape in FIGS. 12A and 12B, the shape is not limited thereto.

REFERENCE SIGNS LIST 1 inlay
11 base substrate
12 IC chip
12a electrode
13 antenna
16 covering part
18 through-hole
30 RFID wrist band
31 storage part
33 elastic block section
34 elastic band section
36 inner wall
37 uneven surface
38 support
40 point securing portion
42 projection portion
44 mounting groove
46 insertion hole

The invention claimed is:

1. An RFID wrist band, comprising:
an elastic block section including a storage part which is airtight;
an elastic band section connected to the elastic block section to form an annular shape; and
an inlay stored in the storage part and including a base substrate, an antenna on the base substrate, and an IC chip connected electrically with the antenna, wherein
the inlay is not fixed to an inner wall of the storage part, and
the storage part is larger than a volume occupied by the inlay.

2. The RFID wrist band according to claim 1, wherein at least one part of the inner wall of the storage part in contact with the inlay is constituted by an uneven surface.

3. The RFID wrist band according to claim 1, wherein the antenna and the IC chip are exposed on the base substrate.

4. The RFID wrist band according to claim 1, wherein the elastic block section and the elastic band section have different colors.

5. The RFID wrist band according to claim 1, wherein the elastic block section and the elastic band section have different hardness.

6. The RFID wrist band according to claim 1, wherein the elastic block section and the elastic band section are composed of silicone resin.

7. An RFID wrist band, comprising:
an elastic block section including a storage part which is airtight;
an elastic band section connected to the elastic block section to form an annular shape; and
an inlay stored in the storage part and including a base substrate, an antenna on the base substrate, and an IC chip connected electrically with the antenna, wherein
one part of the inlay is fixed to an inner wall of the storage part, and
the storage part is larger than a volume occupied by the inlay.

8. The RFID wrist band according to claim 7, wherein the elastic block section and the elastic band section have different hardness.

9. The RFID wrist band according to claim 7, wherein the elastic block section and the elastic band section are composed of silicone resin.

10. The RFID wrist band according to claim 7, wherein the elastic block section and the elastic band section have different colors.

11. The RFID wrist band according to claim 7, wherein the inlay is fixed to the inner wall of the storage part by a point securing portion formed in a part of the inlay.

12. The RFID wrist band according to claim 7, wherein the part of the inlay is fixed by a projection portion formed on the inner wall of the storage part.

13. The RFID wrist band according to claim 7, wherein the inlay is engaged in at least one mounting groove formed on the inner wall of the storage part.

14. The RFID wrist band according to claim 7, wherein the inlay includes a through-hole, and a support formed on the inner wall of the storage part penetrates through the through-hole.

15. The RFID wrist band according to claim 7, wherein the antenna and the IC chip are exposed on the base substrate.

16. An RFID wrist band, comprising:
- an elastic block section including a storage part which is airtight;
- an elastic band section connected to the elastic block section to form an annular shape; and
- an inlay stored in the storage part and including a base substrate, an antenna on the base substrate, and an IC chip connected electrically with the antenna, wherein
- the storage part is larger than a volume occupied by the inlay so that the inlay is movable in the storage part.

* * * * *